United States Patent
Yamazaki et al.

(10) Patent No.: US 7,169,100 B2
(45) Date of Patent: Jan. 30, 2007

(54) TOOL CHANGE MAGAZINE FOR LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi. Pref. (JP)

( * ) Notice: Subject to any disclaimer, the term of this patent is extended or adjusted under 35 U.S.C. 154(b) by 0 days.

(21) Appl. No.: 11/121,428

(22) Filed: May 4, 2005

(65) Prior Publication Data
US 2005/0266974 A1   Dec. 1, 2005

(30) Foreign Application Priority Data
May 26, 2004   (JP) .............................. 2004-155917

(51) Int. Cl.
*B23Q 3/155* (2006.01)
*B23P 13/04* (2006.01)

(52) U.S. Cl. .............................. 483/16; 483/7; 483/32; 29/557

(58) Field of Classification Search .................. 483/32, 483/7, 16, 3; 219/121.36, 121.5, 121.48, 219/121.67, 11.68; 29/557, 563
See application file for complete search history.

(56) References Cited

U.S. PATENT DOCUMENTS 3,650,178 A * 3/1972 Appleton ..................... 409/202
4,559,684 A * 12/1985 Pryor ........................... 29/557
4,564,995 A * 1/1986 Kase ............................ 29/563
4,635,342 A * 1/1987 Balding ......................... 483/7
4,831,714 A * 5/1989 Babel et al. .................... 483/3
5,964,016 A * 10/1999 Ito et al. ..................... 29/27 C
6,097,020 A * 8/2000 Karasaki ................ 219/121.61
6,347,259 B1 * 2/2002 Goldenberg et al. ........ 700/218
6,357,094 B1 * 3/2002 Sugimoto ................... 29/27 C
6,874,213 B2 * 4/2005 Prust et al. ................. 29/27 C

FOREIGN PATENT DOCUMENTS

JP    06-304755    11/1994
JP    2003-181671    7/2003

* cited by examiner

*Primary Examiner*—Dana Ross
(74) *Attorney, Agent, or Firm*—Renner, Otto, Boisselle & Sklar, LLP

(57) ABSTRACT

The invention aims at providing a tool change magazine for laser beam machine to improve machining efficiency of a laser beam machine by installing a tool change magazine containing laser machining tools equipped with a torch and a nozzle replaceably attached to the tip of the torch.

A setup station 100 for laser machining tools is installed outside a machining area of a laser beam machine. It includes a tool station 200 of the laser beam machine. The tool station 200 of the laser beam machine is equipped, for example, with four tool change magazines 220. A laser machining tool 60 is returned from a machining head 50 to a tool change magazine 220 and a new laser machining tool 60 from a tool change magazine 220 is mounted on the machining head 50.

7 Claims, 17 Drawing Sheets

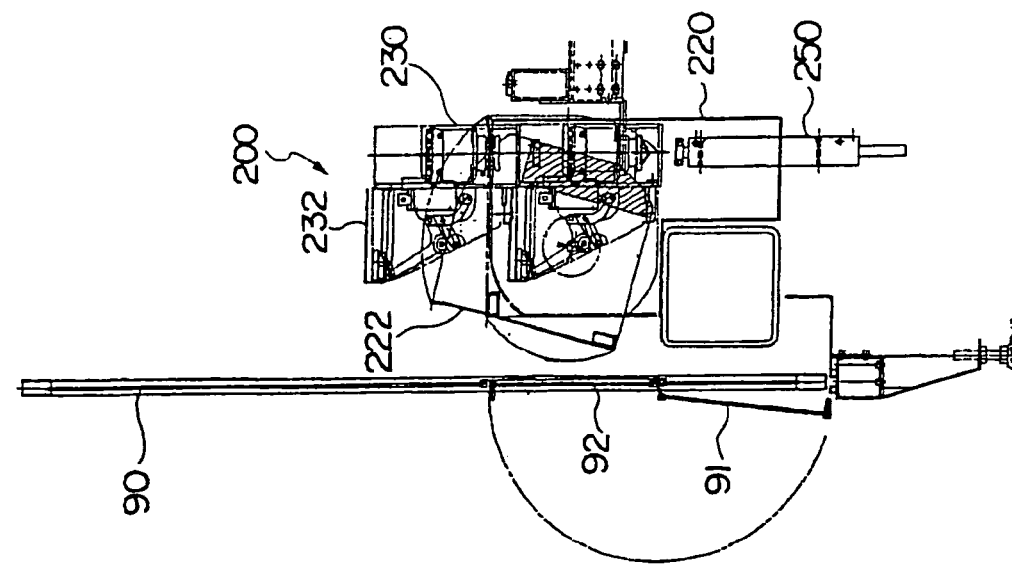
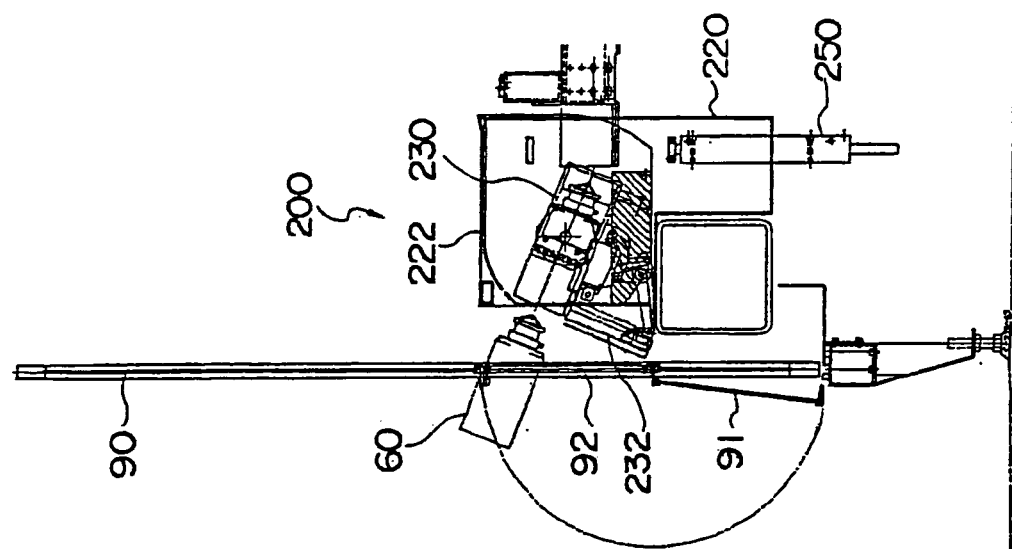
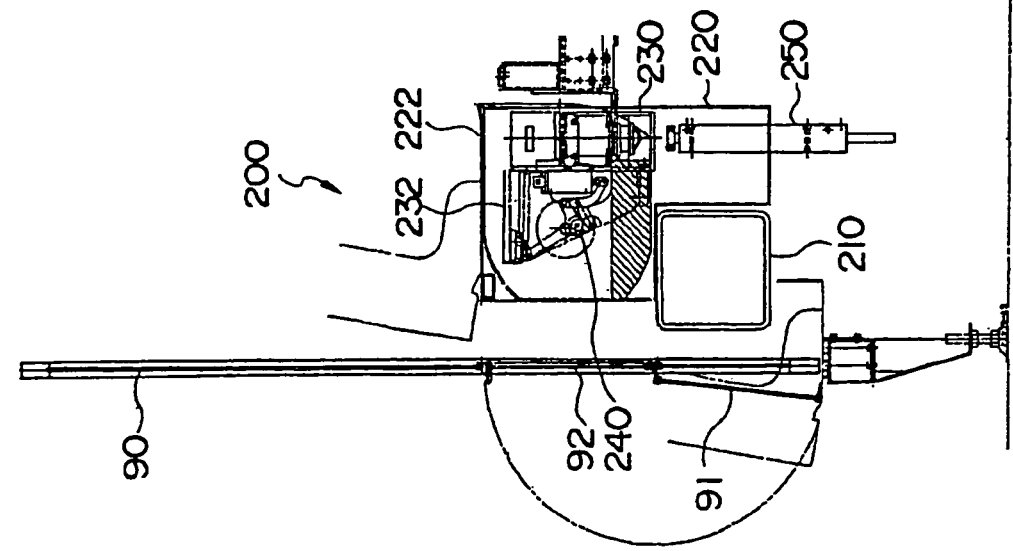

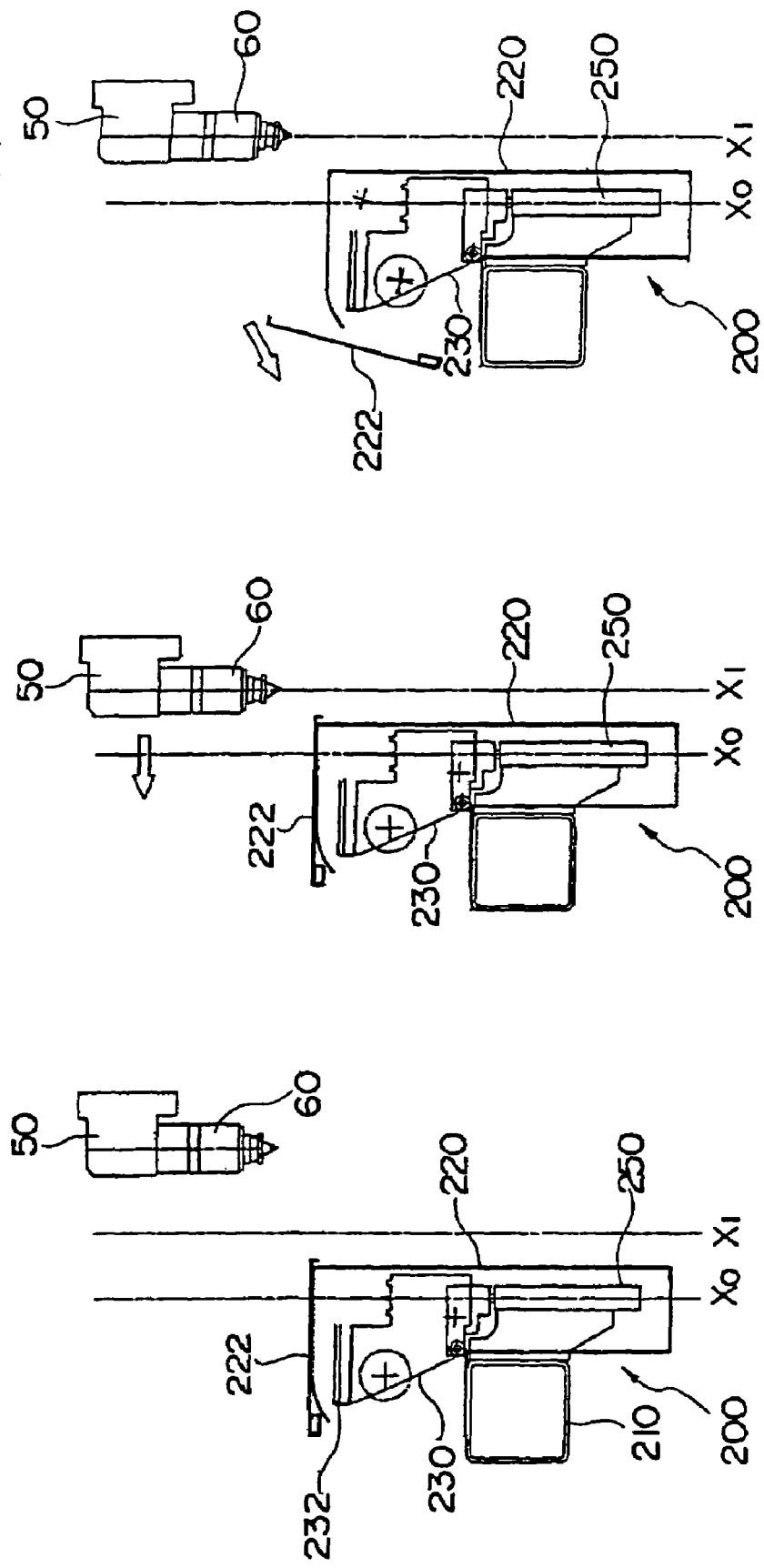

TOOL CHANGE MAGAZINE FOR LASER BEAM MACHINE

The present application is based on and claims priority of Japanese patent application No. 2004-155917 filed on May 26, 2004, the entire contents of which are hereby incorporated by reference.

BACKGROUND OF THE INVENTION

1. Field of the Invention

The present invention relates to a tool change magazine (hereinafter also referred to as a "magazine") which makes it possible to use unskilled operators in operating a laser beam machine, maximize machining quality and productivity for each material and workpiece thickness, and accomplish long, unattended operation.

2. Description of the Related Art

There is a known plasma machine capable of changing a torch automatically (see Japanese Patent Laid-Open Publication No. 6-304755 (Patent Document 1)). The plasma machine is equipped with a torch change system comprising a stocker (disk) indexable by an NC system.

The torch change system described above changes tools using an indexing mechanism, and thus requires an extra drive system (rotational axis) other than linear axes. This increases overall machine cost, makes the machine complex, and lowers reliability.

Further, since tools are arranged on the circumference of the stocker, if they are large in number, the size of the disk is increased, taking up a great amount of space.

The stocker is located in a machining area, making it very dangerous to pick up a tool from the stocker manually for a tool change. Thus, when changing a tool, machining must be stopped, reducing productivity greatly.

Since distance between a machining point and the rotational center of the disk-like stocker is fixed on the disk-shaped stocker, installation space of the stocker is restricted. This limits the number and size of tools in the stocker and causes interference between the stocker and workpiece when the workpiece is mounted and dismounted, resulting in greatly reduced operability.

SUMMARY OF THE INVENTION

In view of the above circumstances, the present invention has an object to provide a laser beam machine equipped with magazines for changing laser machining tools automatically and capable of accomplishing long, unattended operation.

A laser beam machine according to the present invention comprises, as basic means, a bed, a pallet which is disposed on the bed and holds a workpiece, a column which moves along an X axis, that is, a longitudinal axis of the bed, a saddle which is supported by the column and moves along a Y axis orthogonal to the X axis, and a machining head which is supported by the saddle and moves along a Z axis perpendicular to a plane formed by the X axis and Y axis, and a laser machining tool replaceably attached to the machining head. Further, it comprises the tool change magazine for laser machining tools, the tool change magazine being disposed at an automatic tool change position outside a machining area.

Furthermore, the laser machining tool comprises a torch which has optical means including a condenser lens; and a nozzle which is replaceably attached to the tip of the torch. The tool change magazine is placed on the plane formed by the X axis and the Y axis.

The tool change magazine is placed on a plane orthogonal to the plane formed by the X axis and the Y axis.

Tool change magazines are placed in a single row, in multiple rows, or in a matrix. Furthermore, the laser beam machine comprises a dust-proof shutter which covers top of the tool change magazine and opens only when the laser machining tool is changed.

According to the present invention, since the tool change magazines for laser machining tools are placed outside the machining area, the tools can be placed meticulously along linear axes, and thus a tool storage area (area occupied by tools) can be minimized.

Since automatic tool changes can be carried out along linear axes which movably compose a machining point, there is no need to add a new drive system (e.g., a rotational axis). This reduces machine cost, simplifies the machine, and increases reliability.

The tool change magazines may be arranged not only on a single plane.

Since the tool change magazines are installed outside the machining area, tools can be attached and detached manually even during machining, allowing operators to work safely.

Furthermore, the present invention makes it possible to put in and take out tools safely at any time as well as to carry out tool maintenance and tool changes, even during machining without opening a safety cover.

The replacement tool has a dust-proof shutter mechanism installed at an opening for connection with an external optical path system. Clean air is sprayed from inside the external optical path system with the tool brought as close as possible to a mount of the external optical path system, the shutter is opened while preventing intrusion of air from outside, and the tool is attached to the external optical path system instantaneously. This ability to prevent intrusion of dust from outside makes it possible to prevent contamination of machining lens mounted in the tool, extending the life of the machining lens, and thereby maintaining stable, high-quality machining.

By placing the tool change position for the magazines separately from the machining point and installing the magazines away from the machining area, it is possible to minimize the area occupied by tools even when a large number of tools are mounted.

Since the stocker is located outside the machining area, tools can be changed safely during the operation of the machine, improving productivity over the conventional technique.

The number and size of tools are less limited than in the case of the conventional disk-shaped stocker.

There is no interference between the magazine and workpiece when the workpiece is mounted and dismounted. This improves operability over the conventional technique.

BRIEF DESCRIPTION OF THE DRAWINGS

FIG. 9 is an explanatory diagram illustrating a tool station of the laser machining tools;

FIG. 10-1 is an explanatory diagram illustrating operation of the tool station of the laser beam machine;

FIG. 10-2 is an explanatory diagram illustrating operation of the tool station of the laser beam machine;

FIG. 10-3 is an explanatory diagram illustrating operation of the tool station of the laser beam machine;

FIG. 12-1 is an explanatory diagram illustrating operation of the tool station of the laser beam machine;

FIG. 12-2 is an explanatory diagram illustrating operation of the tool station of the laser beam machine;

FIG. 12-3 is an explanatory diagram illustrating operation of the tool station of the laser beam machine.

DETAILED DESCRIPTION OF THE PREFERRED EMBODIMENTS

Figure 1:
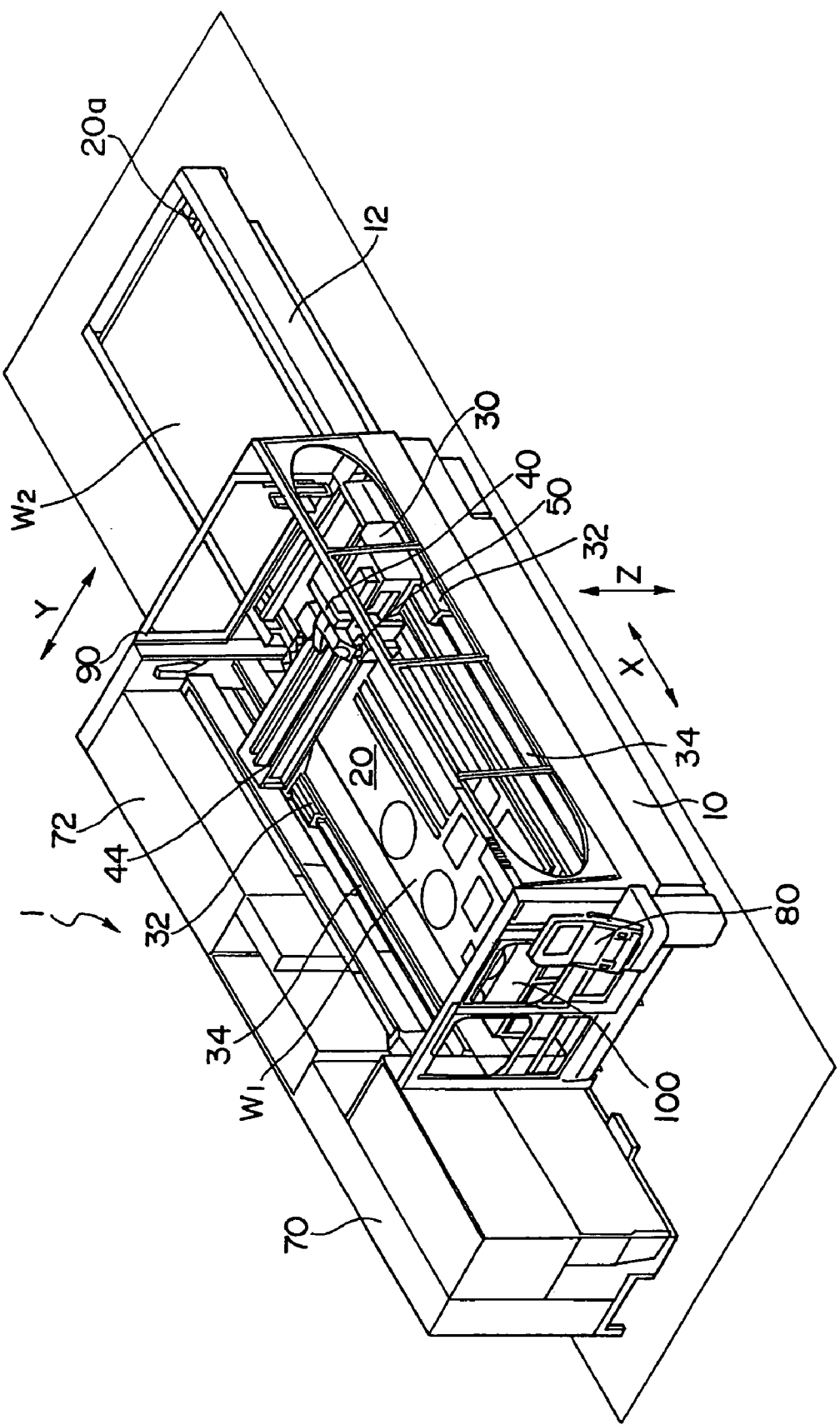
FIG. 1 is a perspective view showing an entire laser beam machine according to the present invention.
Figure 2:
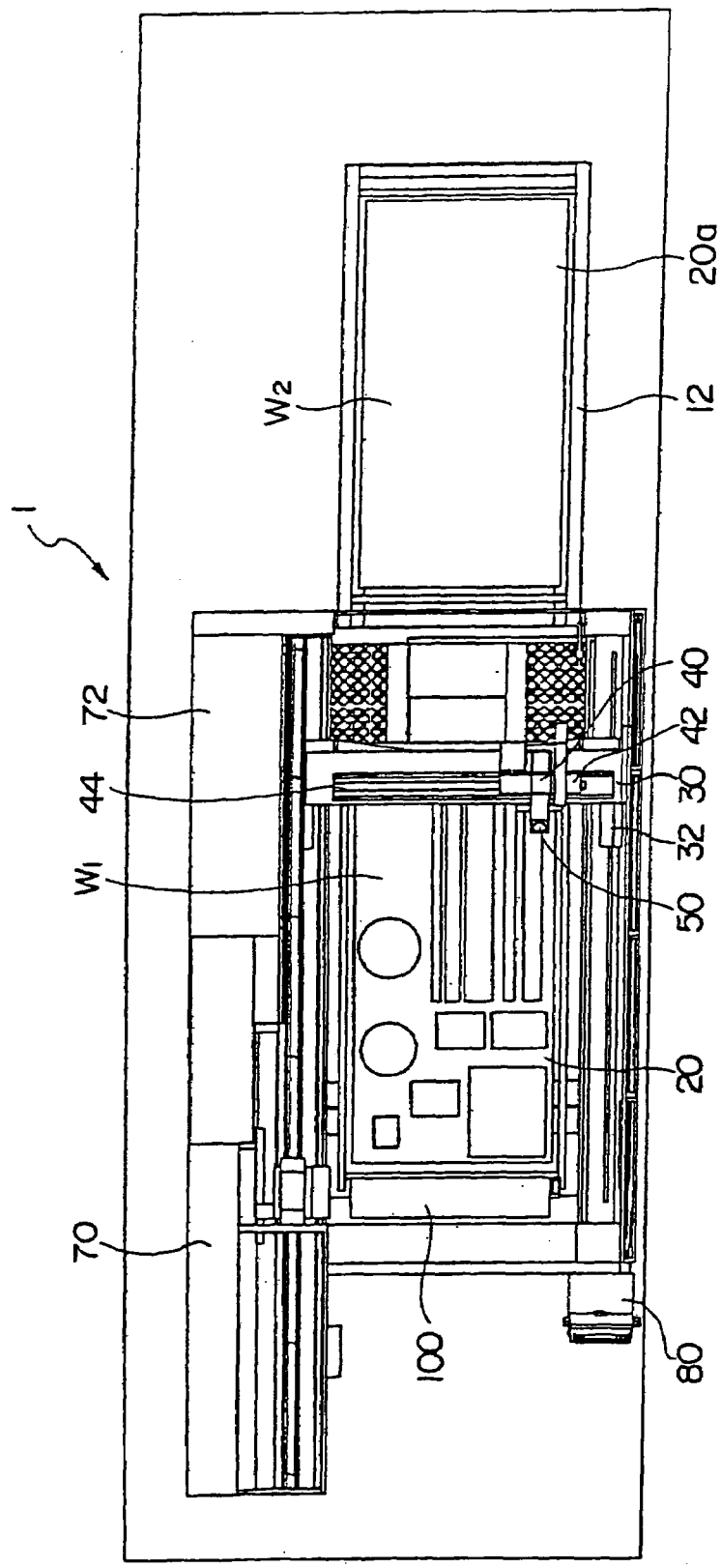
FIG. 2 is a plan view of the laser beam machine according to the present invention.
Figure 3:
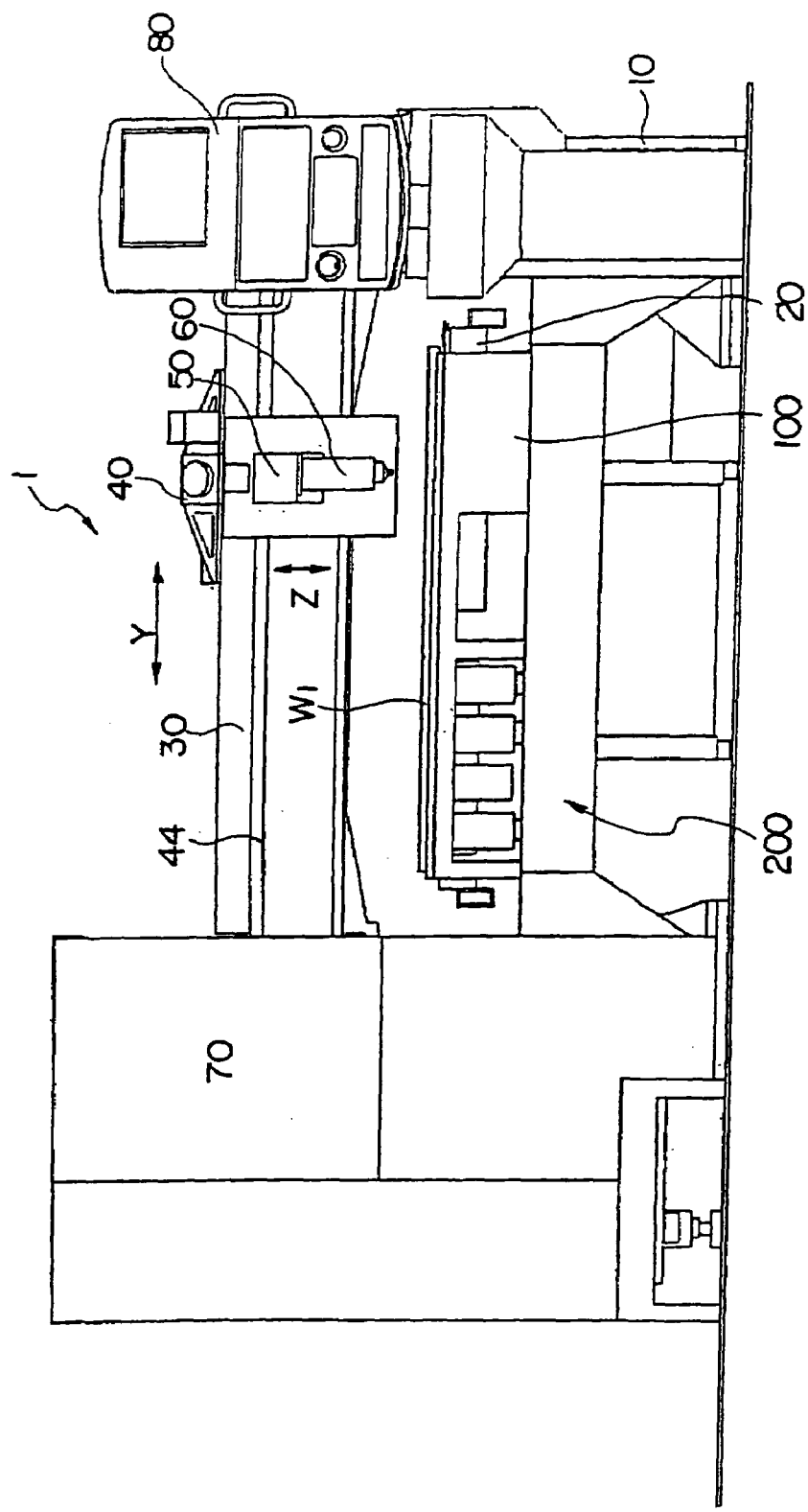
FIG. 3 is a front view of essential part of the laser beam machine according to the present invention.
Figure 4:
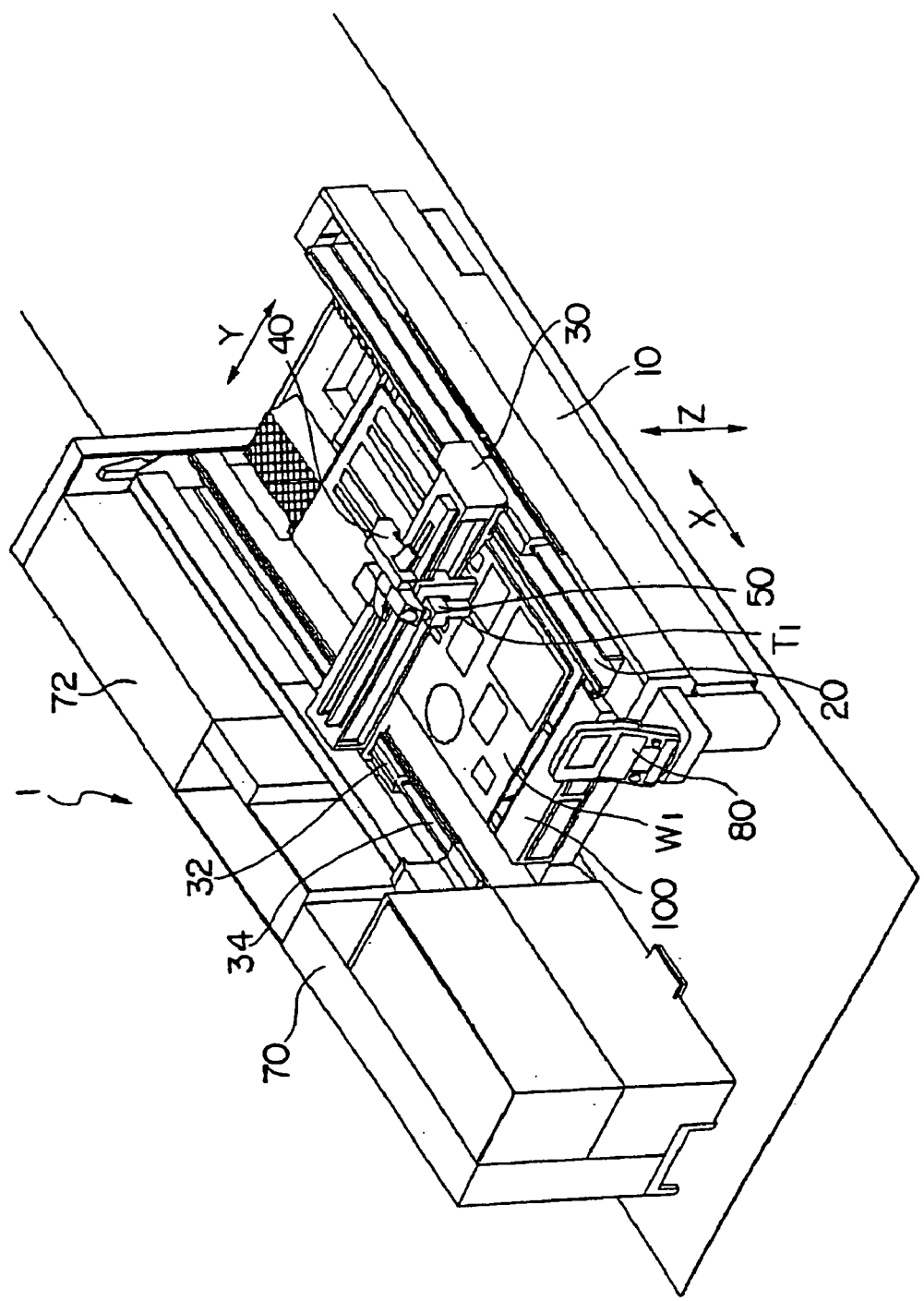
FIG. 4 is a perspective view of the essential part of the laser beam machine according to the present invention.
Figure 5:
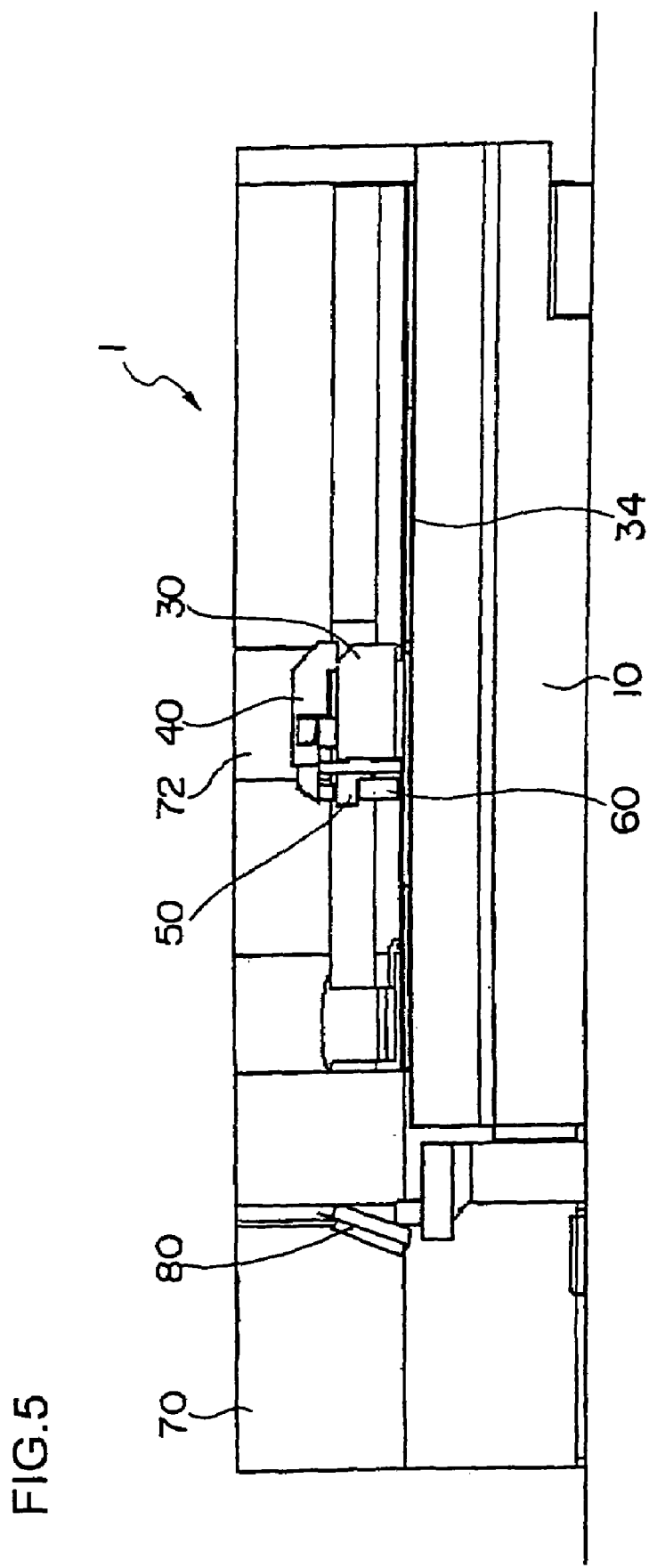
FIG. 5 is a side view of the essential part of the laser beam machine according to the present invention.

FIG. 1 is a perspective view showing an overall configuration of a laser beam machine according to the present invention, FIG. 2 is a plan view, FIG. 3 is a front view, FIG. 4 is a perspective view of the relevant portion, and FIG. 5 is a side view.

A laser beam machine, generally denoted by reference number 1, has a pallet (table) 20 which is disposed on a bed 10 to carry a plate-shaped workpiece $W_1$. A pallet changer 12 is placed on the longitudinal extension of the bed 10, and a pallet 20a carrying a workpiece $W_2$ to be machined next is awaiting its turn.

A pair of guide rails 34 are installed on both sides of the bed 10 along its length and a column 30 is mounted on the guide rails 34 in such a way as to be movable along an X axis.

Means for driving the column 30 along the X axis is provided by, for example, a linear motor, which is formed by a stator installed on the guide rails 34 and a moving member installed on a linear-motion guide 32.

A guide rail 44 is installed on the column 30 along a Y axis orthogonal to the X axis and a saddle 40 is mounted in such a way as to be movable along the Y axis. The saddle 40 is equipped with a linear-motion guide 42 which is engaged with the guide rail 44. A linear motor is formed by the guide rail 44 and linear-motion guide 42.

The saddle 40 has a guide rail installed along a Z axis perpendicular to the plane formed by the X axis and Y axis and has a machining head 50 mounted in such a way as to be movable along the Z axis. The machining head 50 has an optical system which admits a laser beam from a laser oscillator 72.

The machining head 50 is equipped replaceably with a laser machining tool 60. A machining area is fitted with a cover 90 to ensure safety. A power panel 70 and the laser oscillator 72 are disposed adjacent to the bed 10. A control panel 80 for use by the operator to give various commands is disposed on a longitudinal end of the bed 10. A setup station 100 for laser machining tools is installed on that end of the bed 10 which is closer to the control panel 80.

Figure 6:
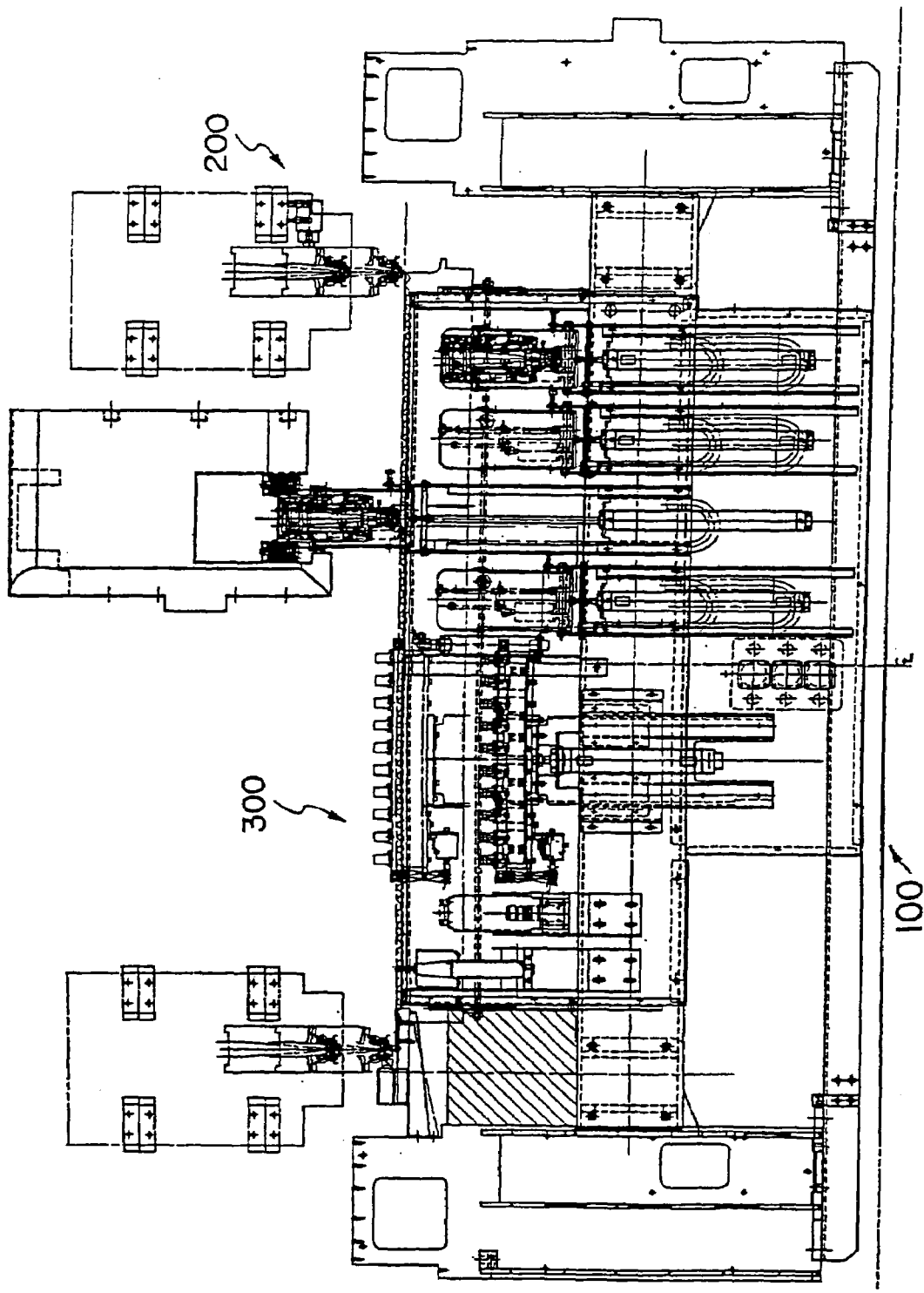
FIG. 6 is a front view of a setup station for laser machining tools.
Figure 7:
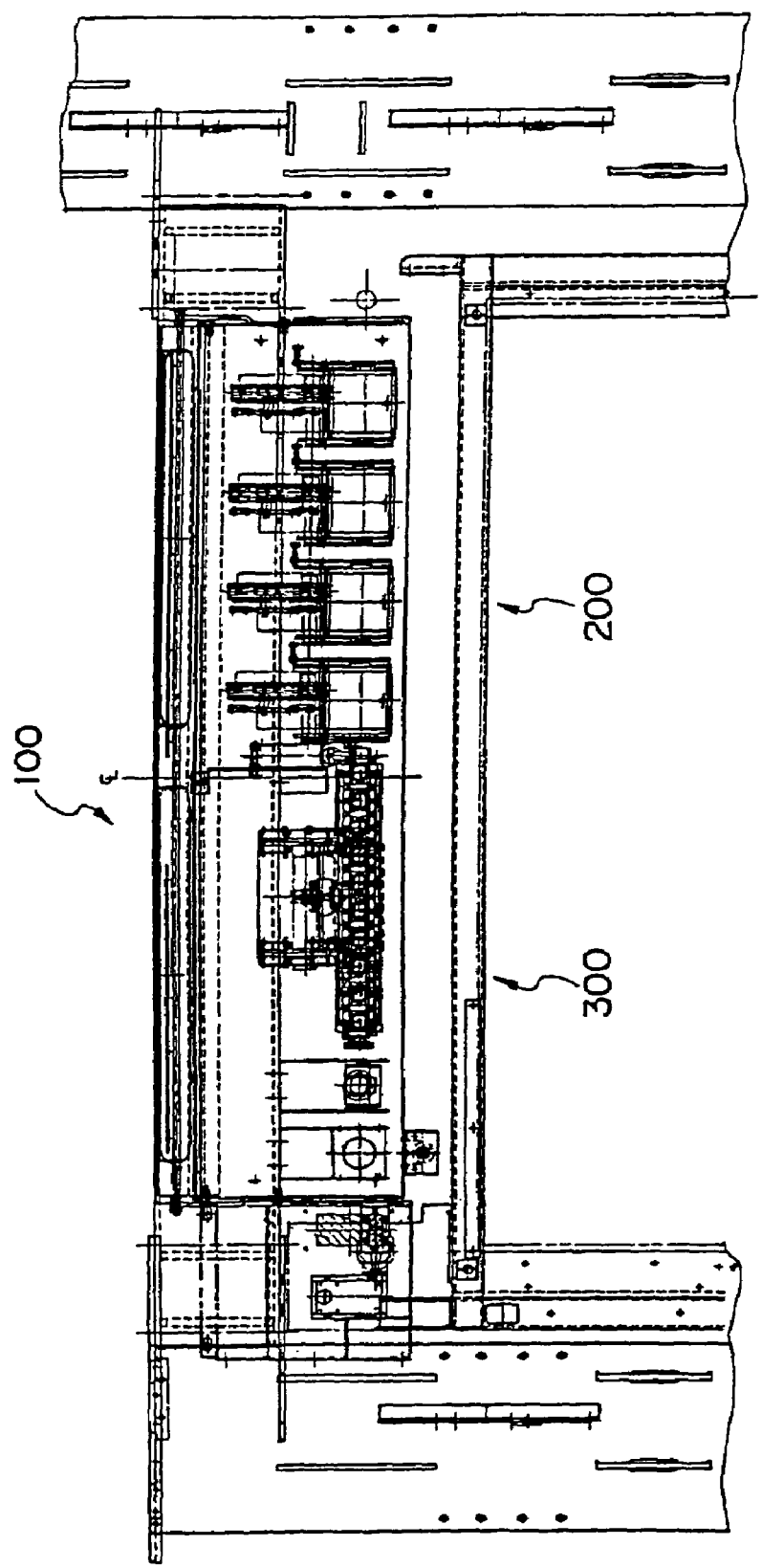
FIG. 7 is a plan view of the setup station for laser machining tools.

FIG. 6 is a front view of the setup station 100 for laser machining tools as viewed from the table and FIG. 7 is a plan view.

The setup station 100 for laser machining tools includes a tool station 200 and nozzle station 300, where the tool station 200 is equipped with a tool change magazine for laser machining tools which in turn are equipped with a torch and nozzle while the nozzle station 300 is equipped with a nozzle change magazine for nozzles of laser machining tools.

Figure 8A:
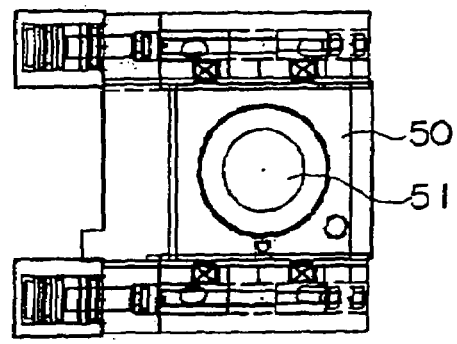
FIG. 8 is an explanatory diagram illustrating structure of the tip of the laser machining tool.
Figure 8B:
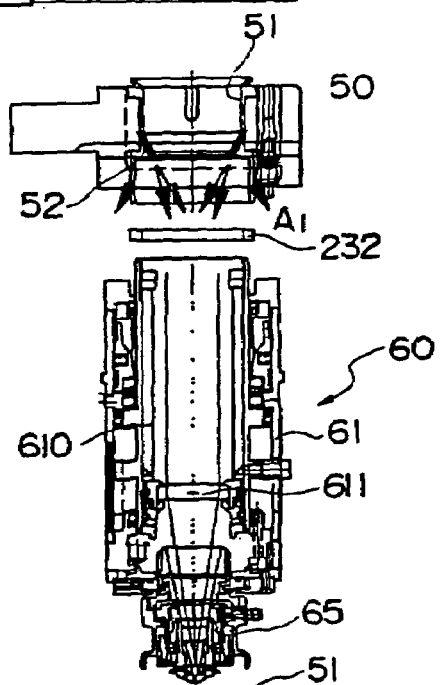
Figure 8C:
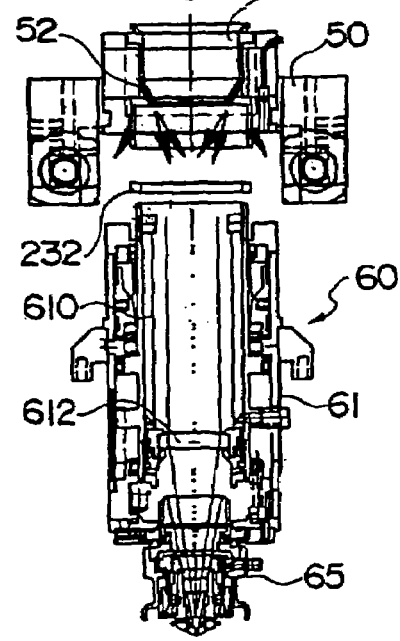

FIG. 8(a) is a plan view, FIG. 8(b) is a front view, and FIG. 8(c) is a side view showing configuration of a tip portion of the machining head 50.

The machining head 50 contains a laser beam guide tube 51 which is equipped on its outer periphery with a nozzle 52 to spray clean air $A_1$.

The laser machining tool 60 is equipped with a torch 61 and a nozzle 65 which is replaceably attached to a tip portion of the torch 61.

The laser machining tool 60 removed from the machining head 50 is stored in the magazine 220 in a manner described later and is automatically replaced with a new tool contained in the magazine 220.

An openable/closable dust-proof shutter 232 is installed above the magazine 220 to protect a condenser lens 611 and the like in a body tube 610 of the torch 61 during tool changes.

During changes of laser machining tool 60, an opening of the torch 61 is covered by the dust-proof shutter 232 and clean air $A_1$ is sprayed from the nozzle 52 to prevent intrusion of air, dust, dirt, etc. from outside.

FIG. 9 is an explanatory diagram illustrating a structure of the tool station 200 of the laser beam machine.

The tool station 200 of the laser beam machine is located at an end of the bed 10 and has a base 210 which extends along the Y axis. A plurality of magazines 220 are arranged along the Y axis on the base 210. According to this example, the laser beam machine is equipped with four magazines 220. However, the number of magazines 220 may be changed as appropriate.

A magazine cover 222 is installed openably/closably above the magazine 220 and a holder 230 of the laser machining tool 60 is installed in the magazine 220.

The holder 230 of the laser machining tool 60 is tilted freely by a tilting mechanism 240. The holder 230 is raised and lowered freely along the Z axis by a cylinder 250 installed in the magazine 220.

The holder 230 is equipped with the dust-proof shutter 232 which covers and reveals an upper opening, to protect the top of the stored laser machining tools 60.

A cover 90 installed around a machining portion of the laser beam machine has an opening 92 which faces the tool station 200. An openable/closable hinged door 91 is installed at the opening.

When replacing the laser machining tool 60 in the holder 230 with a laser machining tool 60 stored at the tool station 200 of the laser beam machine, the operator opens the hinged door 91 of the cover, tilts the holder 230 as shown in FIG. 9(b), and changes the laser machining tool 60 in the holder 230. The tool change operation of the laser machining tool 60 can be performed even during operation of the laser beam machine 1. FIG. 9(c) shows a state in which the holder 230 of the laser machining tool 60 is raised to a tool change position by extending the cylinder 250.

FIGS. 10-1, 10-2, and 10-3 are explanatory diagrams illustrating operations performed at the tool station 200 of the laser beam machine according to the present invention.

They show how a laser machining tool 60 is removed from the machining head 50 and returned to the tool station 200.

Figures 1A, 10:
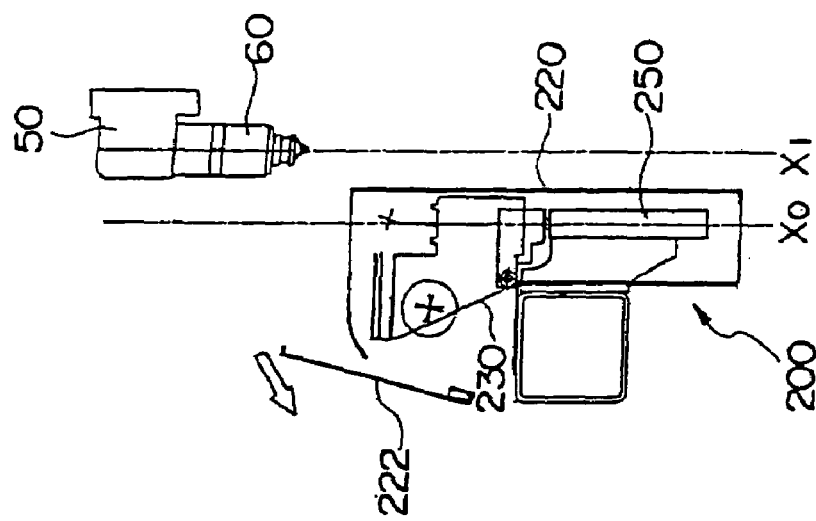

FIG. 10-1(a) shows a state in which laser machining is in progress. At the tool station 200 of the laser beam machine, the holder 230 is stored in the magazine 220, the magazine cover 222 is closed, and the dust-proof shutter 232 is open.

Figures 1B, 10:
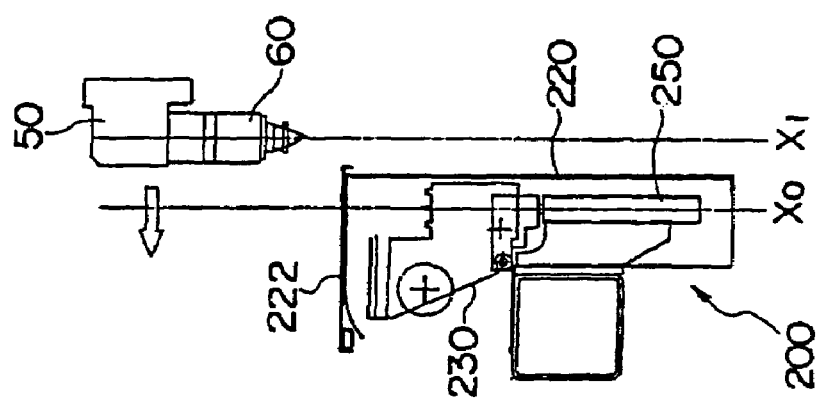

When an automatic tool change (hereinafter referred to as "ATC") command of the laser machining tool 60 is given, the machining head 50 moves to ATC origin position $X_1$ on the X axis and returns to origin position on the Y and Z axes as shown in FIG. 10-1(b).

Figures 1C, 10:
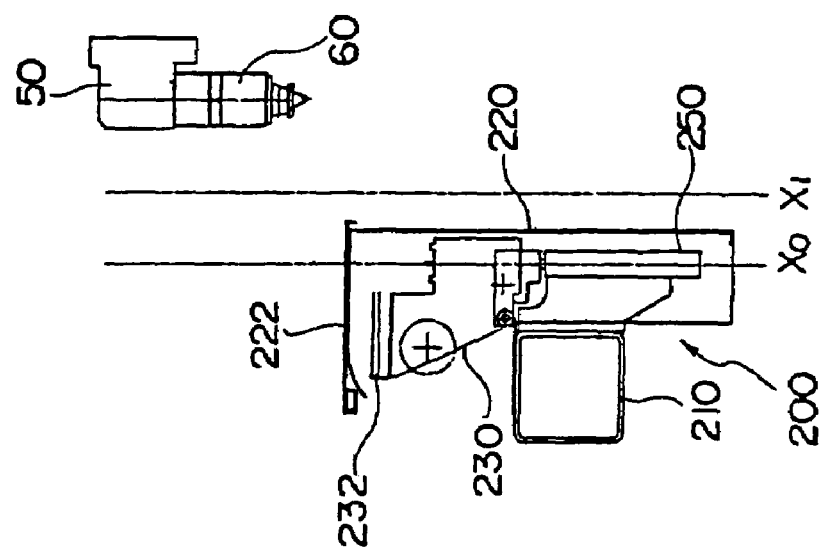

In FIG. 10-1(c), if it is confirmed that the machining head 50 has stopped at the above-described position, the magazine cover 222 of the magazine 220 is opened.

Figures 2D, 10:
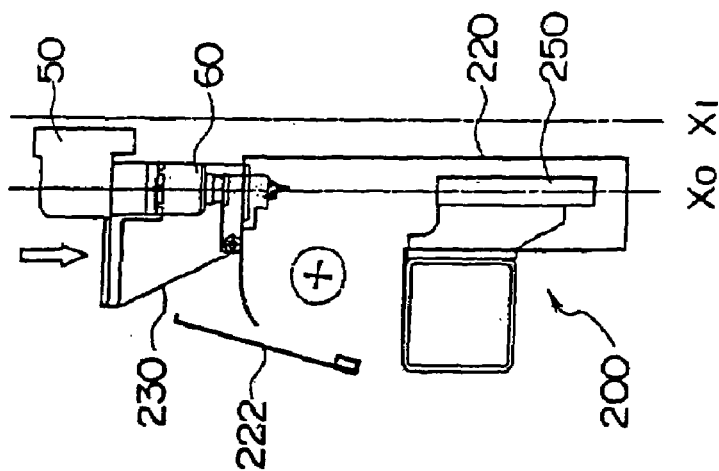

As shown in FIG. 10-2(d), the machining head 50 moves to ATC position $X_0$ on the X axis.

Figures 2E, 10:
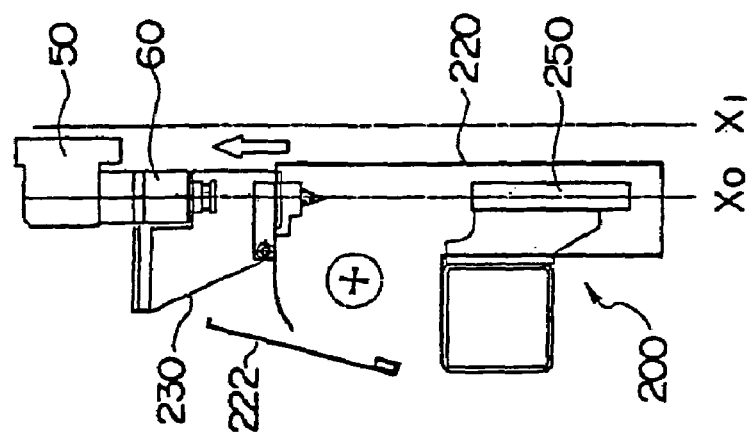

In FIG. 10-2(e), the cylinder 250 in the magazine 220 pushes the holder 230 to the position where the latter can receive the laser machining tool 60 from the machining head 50.

Figures 2F, 10:
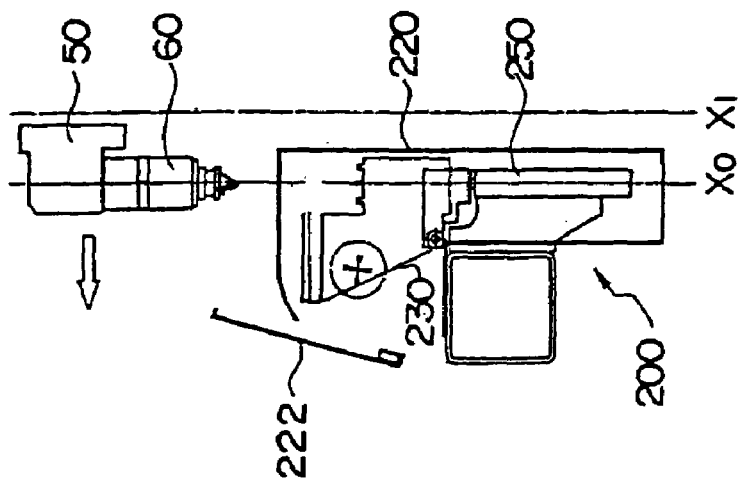

In FIG. 10-2(f), the machining head 50 is lowered and the laser machining tool 60 is clamped in the holder 230.

Figures 3G, 10:
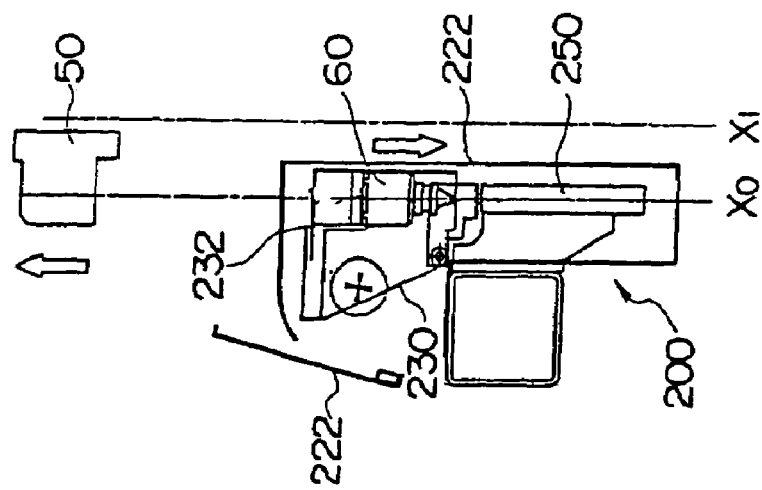

In FIG. 10-3(g), the laser machining tool 60 is lowered and the machining head 50 is raised and unclamped.

Figures 3H, 10:
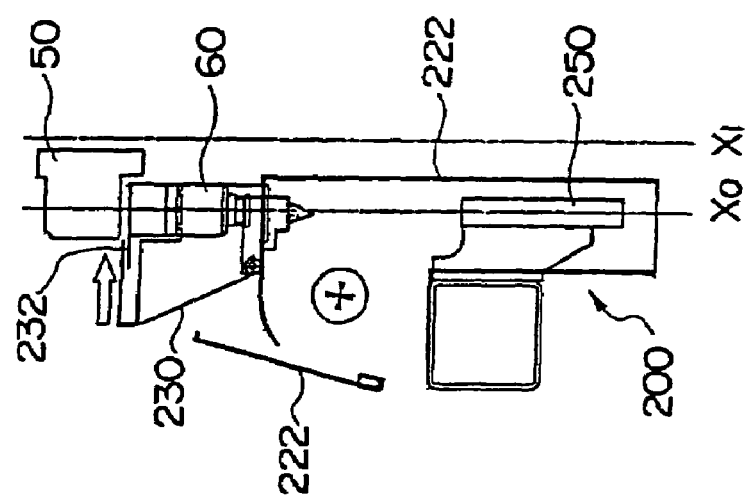

In FIG. 10-3(h), the dust-proof shutter 232 of the holder 230 is closed to protect the top of the laser machining tool.

Figures 3I, 10:
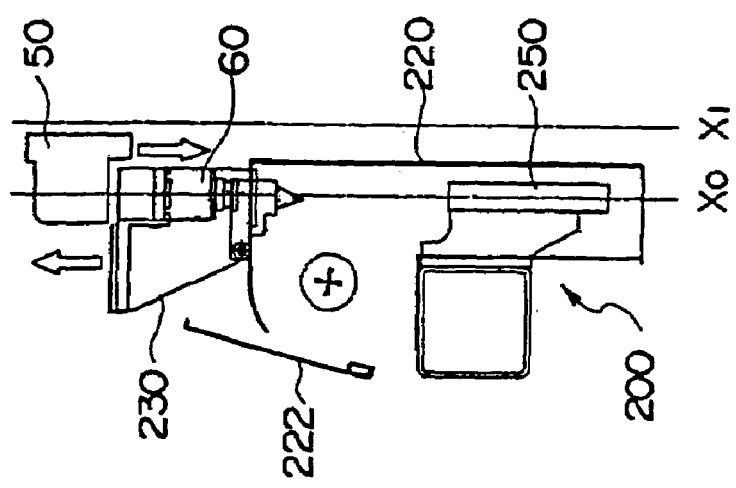

In FIG. 10-3(i), the machining head 50 is returned to the origin position on the Z axis, the cylinder 250 is compressed to lower the holder 230, and the removal of the laser machining tool 60 is completed.

Figure 11:
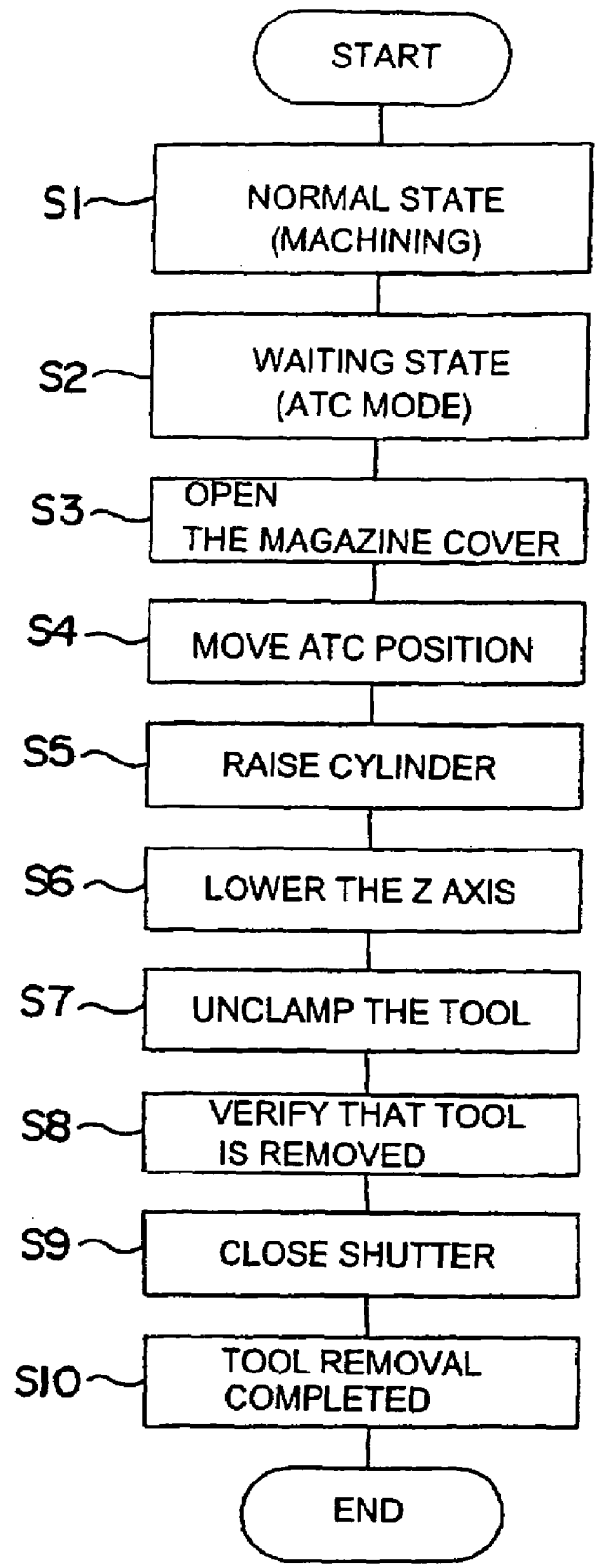
FIG. 11 is a flowchart showing operation of the tool station of the laser beam machine.

FIG. 11 is a flowchart showing the operation of FIG. 10 described above.

FIGS. 12-1, 12-2, and 12-3 show how the laser machining tool 60 stored in a magazine 220 at the tool station 200 of the laser beam machine is mounted on the machining head 50.

Figures 2D, 12:
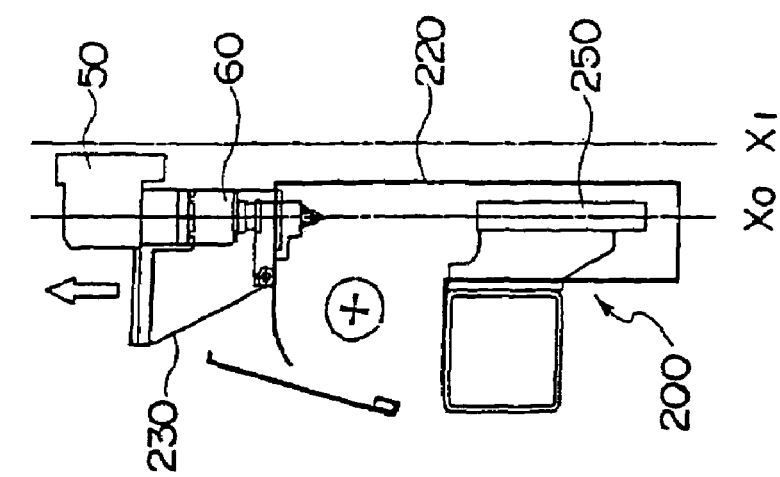
Figures 2E, 12:
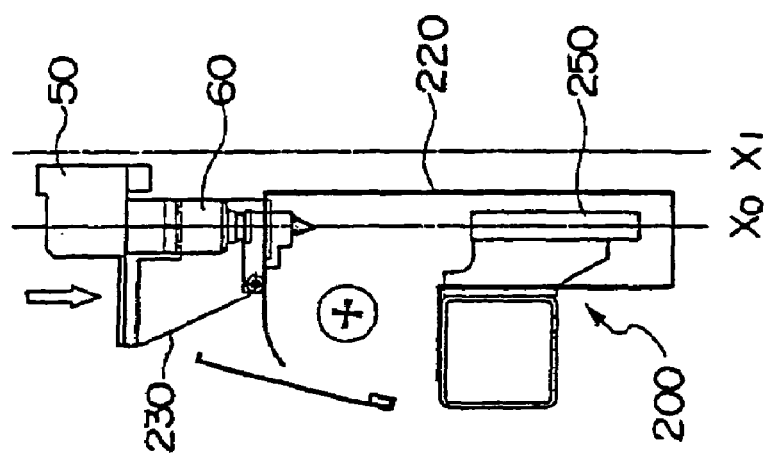
Figures 2F, 12:
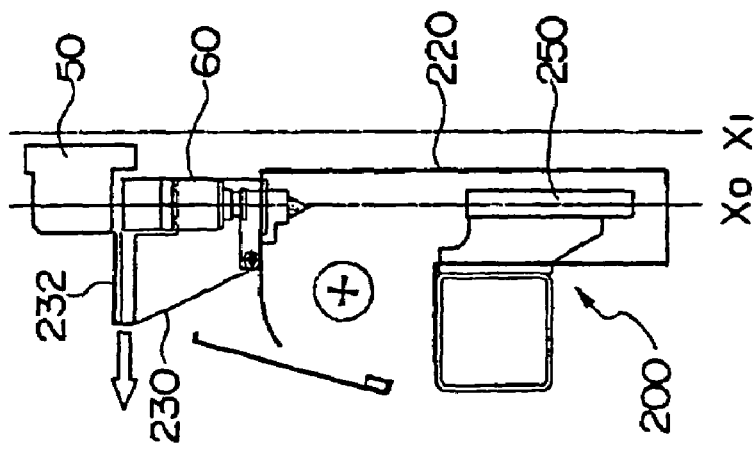
Figures 3I, 12:
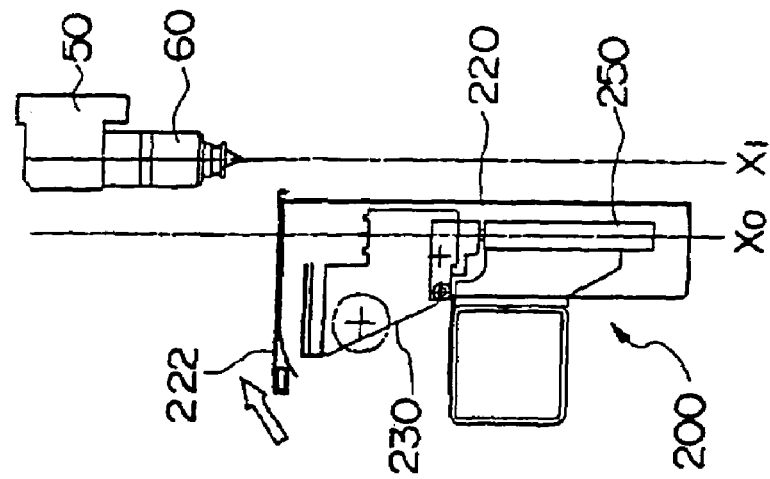
Figures 3H, 12:
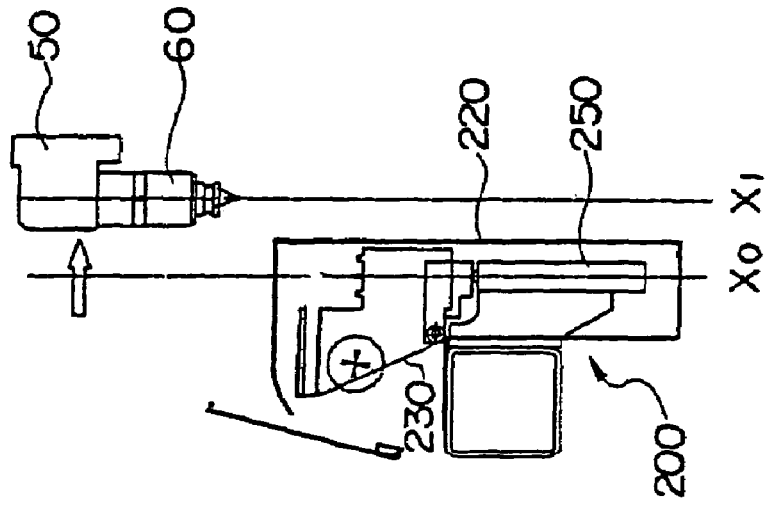
Figures 3G, 12:
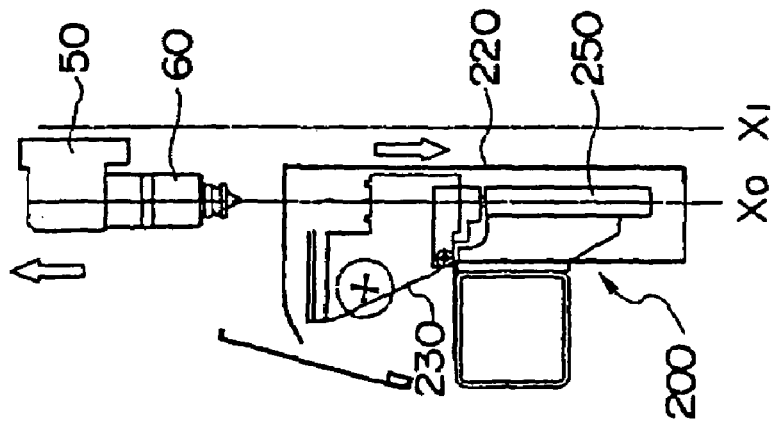

FIG. 12-1(a) shows a state in which the machining head 50 with the laser machining tool 60 removed has returned to the ATC origin position X above a specified magazine 220.

FIG. 12-1(b) shows a state in which the holder 230 containing the laser machining tool 60 has been raised to the ATC position $X_0$ by extending the cylinder 250.

In FIG. 12-1(c), the machining head 50 is lowered.

In FIG. 12-2(d), when the machining head 50 lowers to the ATC position of the laser machining tool, the dust-proof shutter 232 of the magazine 220 opens.

In FIG. 12-2(e), the machining head 50 is lowered to the ATC position $X_0$. In FIG. 12-2(f), the laser machining tool 60 is clamped to the machining head 50.

In FIG. 12-3(g), the machining head 50 is returned to the origin position on the Z axis, and the holder 230 is stored by compressing the cylinder 250.

In FIG. 12-3(h), the X axis is moved to the ATC origin position $X_1$, and the machining head 50 is returned to the Y axis (to waiting position in ATC mode).

In FIG. 12-3(i), the magazine cover 222 is closed to complete the automatic change of the laser machining tool 60.

Figure 13:
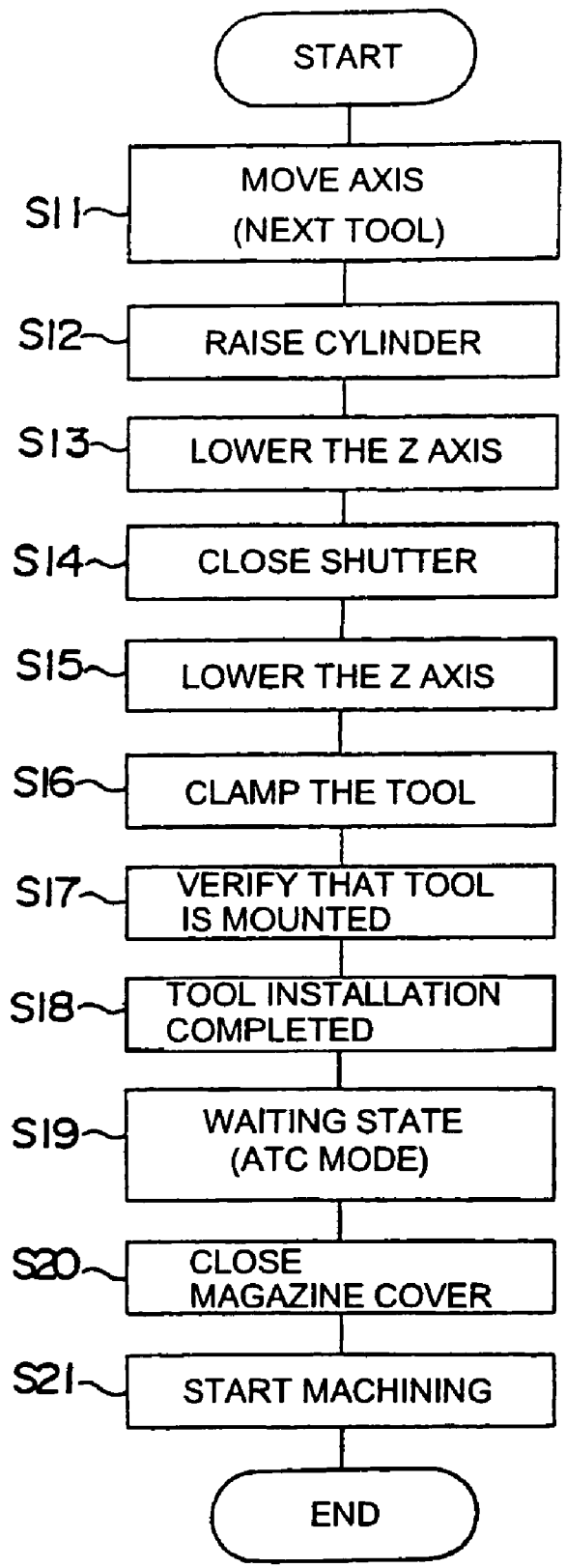
FIG. 13 is a flowchart showing operation of the tool station of the laser beam machine.

FIG. 13 is a flowchart showing the operations described with reference to FIG. 12.

In the example described above, the tool change magazines 220 are arranged in a single row on the tool setup station 100 at an end of the bed 10.

However, this arrangement is not restrictive, and the tool change magazines 220 may be arranged in multiple rows or in a matrix.

Further, the tool change magazines 220 may be placed not only in a plane formed by the X axis and Y axis, but also placed at multiple levels in a plane (e.g., along a Z axis) orthogonal to the plane formed by the X axis and the Y axis.

Besides, they may be placed at any appropriate places where they do not interfere with machining.

Furthermore, although a linear motor has been cited in the above example as a driving means along the X and Y axes, the present invention can also employ a ball screw.

What is claimed is:

1. A laser beam machine comprising: a bed, a pallet which is disposed on the bed and holds a workpiece, a column which moves along an X axis, that is, a longitudinal axis of the bed, a saddle which is supported by the column and moves along a Y axis orthogonal to the X axis, a machining head which is supported by the saddle and moves along a Z axis perpendicular to a plane formed by the X axis and Y axis, and a laser machining tool replaceably attached to the machining head, and a tool change magazine, wherein the tool change magazine is disposed at an automatic tool change position outside a machining area and the machining head is moved to the automatic tool change position to change a tool in cooperation with the tool change magazine located thereat, and the laser machining tool comprises a torch which has optical means including a condenser lens and a nozzle which is replaceably attached to the tip of the torch.

2. The laser beam machine according to claim 1, wherein the tool change magazine is placed on the plane formed by the X axis and the Y axis.

3. The laser beam machine according to claim 2, wherein a plurality of tool change magazines are placed in a single row, in multiple rows, or in a matrix.

4. The laser beam machine according to claim 1, wherein the tool change magazine is placed on a plane orthogonal to the plane formed by the X axis and the Y axis.

5. The laser beam machine according to claim 4, wherein a plurality of tool change magazines are placed in a single row, in multiple rows, or in a matrix.

6. The laser beam machine according to claim 1, wherein a control panel for use by an operator to give various operation commands is disposed at a longitudinal end of the bed.

7. A laser beam machine comprising: a bed, a pallet which is disposed on the bed and holds a workpiece, a column which moves along an X axis, that is, a longitudinal axis of the bed, a saddle which is supported by the column and moves along a Y axis orthogonal to the X axis, a machining head which is supported by the saddle and moves along a Z axis perpendicular to a plane formed by the X axis and Y axis, and a laser machining tool replaceably attached to the machining head, and a tool change magazine, wherein the tool change magazine is disposed at an automatic tool change position outside a machining area and the machining head is moved to the automatic tool change position to change a tool in cooperation with the tool change magazine located thereat, the laser machining tool comprises a torch which has optical means including a condenser lens and a nozzle which is replaceably attached to the tip of the torch, and a dust-proof shutter which covers top of the tool change magazine and opens when the machining head lowers to the automatic tool change position.

* * * * *